United States Patent
Suzuki

(10) Patent No.: US 8,186,909 B2
(45) Date of Patent: May 29, 2012

(54) ARTIFICIAL SEA MOUNT

(75) Inventor: Tatsuo Suzuki, Tokyo (JP)

(73) Assignee: Artificial Sea-Mount Institute Corporation, Tokyo (JP)

( * ) Notice: Subject to any disclaimer, the term of this patent is extended or adjusted under 35 U.S.C. 154(b) by 0 days.

(21) Appl. No.: 12/888,358

(22) Filed: Sep. 22, 2010

(65) Prior Publication Data

US 2011/0008109 A1    Jan. 13, 2011

(30) Foreign Application Priority Data

Sep. 24, 2009    (JP) ................. 2009-218680

(51) Int. Cl.
*E02B 3/06* (2006.01)
*E02B 3/08* (2006.01)
(52) U.S. Cl. ..................................... 405/25
(58) Field of Classification Search ........... 405/15–17, 405/21, 23, 25, 30, 33, 35; 119/207, 208, 119/221, 222, 238, 209, 211
See application file for complete search history.

(56) References Cited

U.S. PATENT DOCUMENTS

| 1,557,409 | A | * | 10/1925 | Bradley | 405/21 |
| 2,835,112 | A | * | 5/1958 | Monnet | 405/29 |
| 5,158,395 | A | * | 10/1992 | Holmberg | 405/21 |
| 5,267,812 | A |   | 12/1993 | Suzuki et al. | |

FOREIGN PATENT DOCUMENTS

JP    H04-304829 A    10/1992

\* cited by examiner

*Primary Examiner* — Sunil Singh
(74) *Attorney, Agent, or Firm* — Blakely, Sokoloff, Taylor & Zafman

(57) ABSTRACT

In an artificial sea-mount constructed by piling up a plurality of block bodies on the seabed to vertically mix water mass in a peripheral sea area using a tidal current, ocean current, and internal wave in that sea area, a cone array formed from three or more cones is constructed linearly on the seabed, and the vertex interval between the cones is set to 0.75 times to 2 times the bottom radius of the cone. It is possible to generate an upwelling current even in the deep sea area by inverted triangle-shaped gaps formed between the cones and the conic surfaces of the cones, and thus obtain effective upwelling flux.

7 Claims, 5 Drawing Sheets

TIDAL CURRENT

TIDAL CURRENT

ARTIFICIAL SEA MOUNT

BACKGROUND OF THE INVENTION

The present invention relates to an artificial sea-mount which is constructed on the seabed to prompt vertical mixing of seawater near the compensation depth.

There has recently been provided a technique of artificially constructing a sea-mount shaped structure on the seabed and making, using the natural energy of a tidal current or ocean current, nutrient salts abundantly contained in seawater below the compensation depth upwell to the surface sea zone (compensation depth) where phytoplankton grows under sunlight. The structure is known to produce an effect of enriching the waters near the artificial sea-mount and causing phytoplankton serving food for fishes and shellfishes to proliferate. In this specification, this structure will be referred to as an artificial sea-mount. Such an artificial sea-mount is constructed by piling up many block bodies made of a recycled material such as coal ash, concrete block bodies, artificial block bodies using discarded materials, or natural block bodies made of stone or the like (to be referred to as block bodies hereinafter).

To obtain a desired upwelling effect by the artificial sea-mount, it is necessary to build a larger-scale artificial sea-mount in the deep sea area. However, since constriction is burdensome, a demand has arisen for an artificial sea-mount that is expected to produce an optimum upwelling effect near the compensation depth, i.e., attain vertical mixing of seawater in a scale as small as possible.

An artificial sea-mount of this type is proposed in U.S. Pat. No. 5,267,812 (reference 1). Reference 1 describes an example of an artificial sea-mount which has a ridge portion formed by linearly connecting, in the horizontal direction, the vertices of a pair of cones arranged at a predetermined height so as to traverse a tidal current. There is also described another example of an artificial sea-mount whose ridge portion that connects the vertices of a pair of cones is lower in height than the vertices. In both artificial sea-mounts, a current that ascends the slanting surface and peels off from the horizontal linear portion of the ridge of the artificial sea-mount makes vortices with a horizontal axis, and simultaneously, a current that goes round the side surfaces of the artificial sea-mount and peels off from there makes vortices with a vertical axis. The two kinds of vortices combine in the countercurrent area formed behind the artificial sea-mount, thereby generating a large upwelling vortex intermittently.

Recent field observations and analyses revealed that in the deep sea area with strong density stratification, the wavelength and wave height of generated internal waves change depending on the water depth, current state, stratification state, and height and shape of an artificial sea-mount. Additionally, it was found that since the direction and velocity of current change over time due to the influence of tidal ebb and flow and the like, the wavelength and wave height of internal waves change temporally. "Density stratification" means a continuous density layer structure formed by surface water which has a low density because of a high temperature and low salinity concentration and deep water which has a low temperature and high salinity concentration.

In general, seawater is difficult to vertically mix in the density stratification state. However, it was found that internal waves generated by a current colliding with an undersea structure or the like cause vertical mixing even near the surface layer. Thus required is an efficient artificial sea-mount which induces vertical mixing in the deep sea area where the water mass density greatly changes between the surface layer and the bottom layer, and water conditions including the density and the vertical distribution of nutrient salts change variously.

To efficiently generate horizontal vortices under water conditions having no or weak density stratification, the artificial sea-mount of reference 1 forms a horizontal ridge portion which runs linearly in a direction almost perpendicular to the current, thereby advantageously inducing an upwelling vortex. However, according to the present inventor's examinations, no remarkable upwelling vortex could be observed in the deep sea area with strong density stratification. It was found that when the density stratification is strong, heavy seawater of the bottom layer is made to readily ride across a structure to efficiently generate internal waves, allowing to actively promote vertical mixing.

SUMMARY OF THE INVENTION

It is an object of the present invention to provide an artificial sea-mount capable of inducing effective vertical mixing even in the deep sea area with strong density stratification.

In order to achieve the above object, according to the present invention, there is provided an artificial sea-mount constructed by piling up a plurality of block bodies on the seabed to vertically mix seawater in a peripheral sea area using a tidal current, ocean current, and internal wave in the sea area where the plurality of block bodies are piled up, comprising a first cone array formed from the plurality of block bodies and including at least three cones arrayed linearly on the seabed, wherein a vertex interval between the cones adjacent to each other in said first cone array is set to 0.75 times to 2 times a bottom radius of the cone.

According to the present invention, the vertex interval between the three or more cones of the artificial sea-mount is set to 0.75 times to 2 times the bottom radius of the cone. Due to inverted triangle-shaped gaps formed between the cones and a plurality of conic surfaces, a tidal current, ocean current, or internal wave colliding with the artificial sea-mount and riding across it generates a complex current or vortex. The complex current or vortex generates internal waves that reach above from upstream to downstream of the artificial sea-mount, and their influence is further propagated upward. For this reason, effective vertical mixing is induced near the compensation depth even in the deep sea area with continuous strong density stratification. The vertical mixing supplies nutrient salts that abundantly exist below the compensation depth to waters above the compensation depth, thereby enriching the sea area.

Changing the vertex interval between the cones of the artificial sea-mount according to the present invention allows to prompt vortex generation by a complex current and induce more effective vertical mixing. Constructing an artificial sea-mount group by arraying a plurality of artificial sea-mounts also enables to induce more effective vertical mixing.

As is well known from past experiences, the artificial sea-mount not only has the vertical mixing function described above but also greatly serves as a fishing bank. As for the fishing bank function, the artificial sea-mount is known to preferably have hiding places in various sizes for a variety of gathering fishes and shellfishes to protect themselves from enemies such as larger migratory fishes. Additionally, it is preferable to provide an attachment substrate material with excellent seawater exchange for organisms, which feed the gathering fishes and shellfishes, to adhere to the surfaces of block bodies and grow. The artificial sea-mount of the present invention can obtain a surface area larger by about 20% and a more complex shape than the artificial sea-mount described in reference 1 in the same volume (the construction cost is assumed to be proportional to the volume of block bodies). Since it is possible to diversify shadows for light and currents and provide many effective attachment surfaces, an enormous amount of food organisms can grow.

On the other hand, regarding construction, a mountain having a continuous linear ridge in the horizontal direction as in reference 1 needs to be constructed by always finely adjusting the block body dropping position. However, the artificial sea-mount according to the present invention can easily and efficiently be constructed in the deep sea by performing centralized control of the vertex position and shape of each cone of the mountain so as to manage the vertex position and height as designed. Additionally, changing the number of cones and vertex interval on design of the artificial sea-mount makes it possible to obtain an artificial sea-mount that has a minimum volume and satisfies the required total upwelling flux while maintaining the high efficiency of upwelling flux per volume.

DESCRIPTION OF THE PREFERRED EMBODIMENTS

First Embodiment

The first embodiment of the present invention will now be described with reference to FIGS. 1A to 3.

Figure 1A:
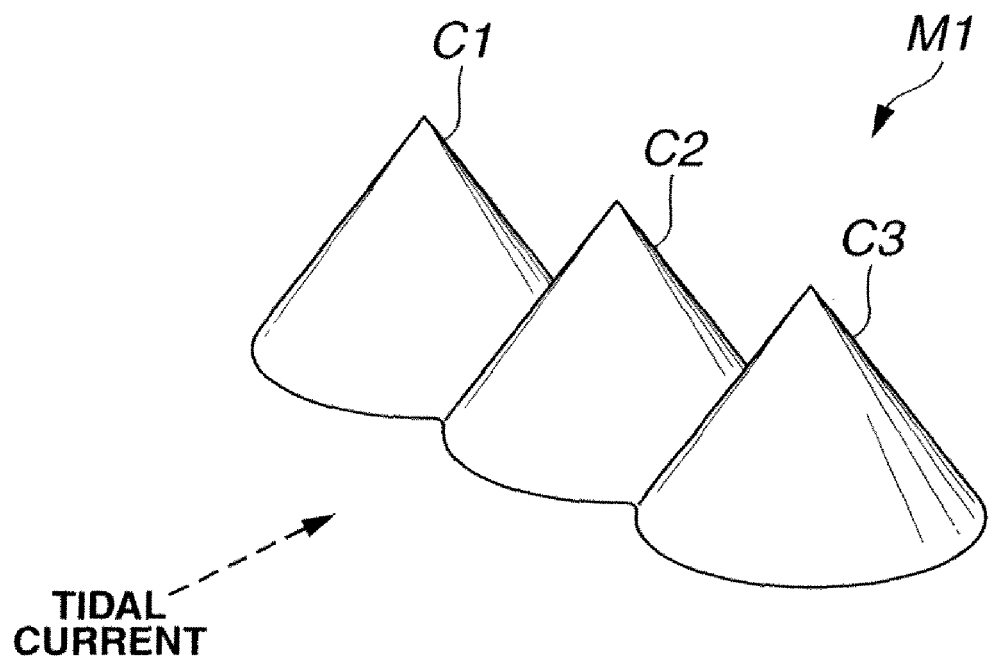
FIGS. 1A and 1B are perspective and front views of an artificial sea-mount according to the first embodiment of the present invention.
Figure 1B:
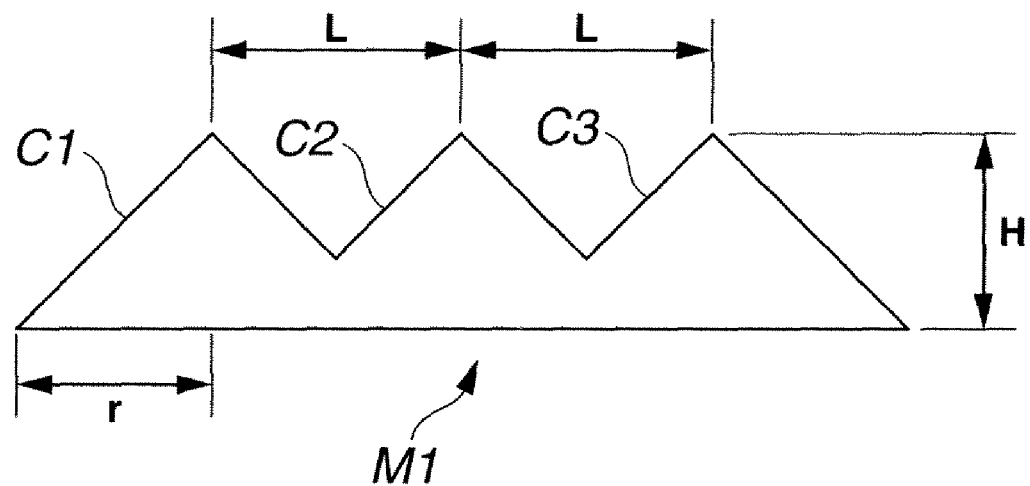

As shown in FIG. 1A, an artificial sea-mount M1 is formed from three cones C1, C2, and C3 (cone array) having a circular base and arrayed linearly in a direction almost perpendicular to the direction of the tidal current, ocean current, and internal waves in the target sea area. The tails of the adjacent cones C1, C2, and C3 come into contact with each other or overlap in dimensions to be described later so as to form a mountain shape. Note that the bases of the cones C1, C2, and C3 need not always be circular, and may have a shape close to a circle. In this embodiment, the cones C1, C2, and C3 are formed into the same size and shape at the same vertex height H and same bottom radius r. In actuality, they may have a little error. A vertex interval L between the cones C1, C2, and C3 adjacent to each other is set to 0.75 to 2 times their bottom radius r.

More specifically, for an artificial sea-mount to be constructed on a continental shelf at a depth of about 160 m, if each cone has height H=20 m and slant inclination H/r=1/2 to ensure its stability on the seabed, radius r=40 m, and vertex interval 1.25r=50 m are assumed.

To construct the artificial sea-mount M1, for example, a workboat such as a bottom-hopper barge is positioned at a first position on the sea so as to sequentially drop and pile up a predetermined amount of block bodies onto the seabed, thereby forming the cone C1. Next, the workboat is moved to a second position far apart by twice the vertex interval between the cones and positioned so as to drop and pile up block bodies onto the seabed a predetermined number of times, thereby forming the cone C3. The cone C2 is then constructed at a third position between the cones C1 and C3 in the same way.

Note that the order of cone construction is not limited to this. Note that the structure does not always have an accurate conic shape as in FIG. 1A at a portion where adjacent cones overlap. However, attaining the designed vertex interval and vertex height is of great importance. Especially in the deep sea, the dropped block bodies drift due to the strong influence of the current until they are settled on the seabed. Controlling the drop position so as to settle the block bodies accurately at the vertex of each cone enables accurate construction.

According to the artificial sea-mount M1 of the first embodiment, three-dimensional gaps with complex inverted triangle-shaped surfaces are formed between the vertices of the cones C1, C2, and C3. In addition, all the tail surfaces, i.e., side surfaces of the artificial sea-mount M1 are conic surfaces. For this reason, the tidal current or ocean current perpendicular to the array direction of the cones C1, C2, and C3 collides with the artificial sea-mount M1, and the current shielded by the structure ascends along the uneven tail surfaces of the cones C1, C2, and C3. The ascending current rides across the artificial sea-mount M1 so as to generate a complex current or vortex, and induces effective internal waves at this time.

If spontaneously generated internal waves collide with the artificial sea-mount M1, the internal waves are expected to break at the artificial sea-mount M1 and prompt mixing. The manner the vortices are generated by the artificial sea-mount M1 is different from that in a uniform current under the conditions of reference 1 having no or weak density stratification. Changes in the current or vortices caused by the current riding across the artificial sea-mount M1 generate effective internal waves above from upstream to downstream of the artificial sea-mount M1. Since the influence of internal waves is propagated upward and upstream/downstream, effective vertical mixing is induced even in the deep sea area with strong density stratification.

Figure 2:
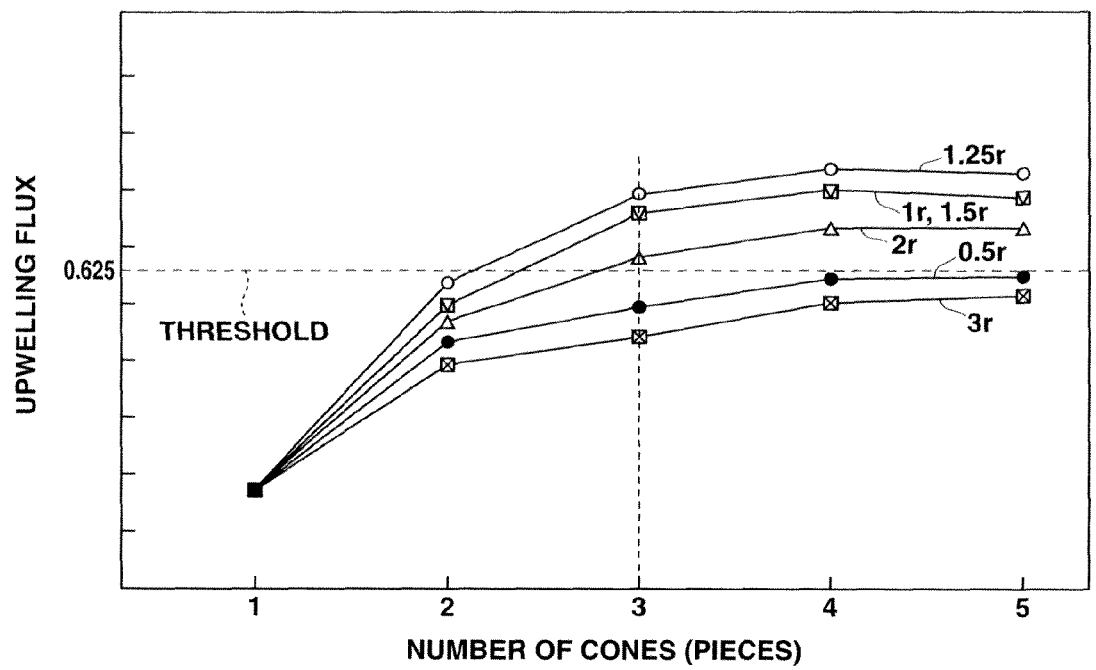
FIG. 2 is a graph showing the relationship between the number of cones and the upwelling flux of the artificial sea-mount according to the first embodiment.

FIG. 2 shows the result of simulation of upwelling flux per unit volume (to be simply referred to as upwelling flux hereinafter) of the artificial sea-mount in FIG. 1A which is formed from a plurality of cones arrayed linearly with their tails overlapping or in contact with each other. The upwelling flux means nutrient salts vertically passing through a horizontal cross section at each depth in the whole flow calculation area. To obtain upwelling flux, markers of concentrations of the nutrient salts are arranged so as to linearly become higher from the surface layer to the bottom layer, and the amounts of the markers vertically moving through each horizontal cross section are averaged for a long time.

FIG. 2 shows upwelling flux obtained by increasing the number of linearly arranged cones from 1 to 5 and setting six intervals L between adjacent vertices shown in FIG. 1A, i.e., 0.5 times (0.5r), 1 times (1r), 1.25 times (1.25r), 1.5 times (1.5r), 2 times (2r), and 3 times (3r) the conic bottom radius r. In this simulation, upwelling flux higher than that of level obtained in reference 1 is set to the lower threshold (=0.625). In this case, the upwelling flux of this embodiment exceeds the threshold when the number of cones is three or more, and L=1r to 2r, as is apparent from FIG. 2.

Figure 3:
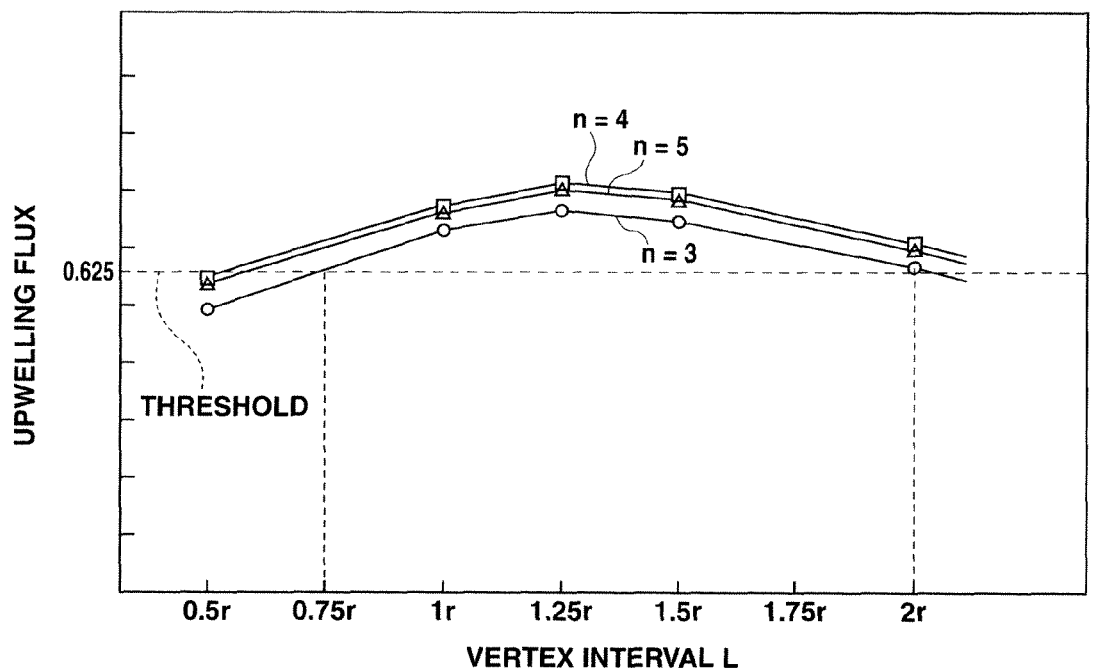
FIG. 3 is a graph showing the relationship between the vertex interval between the cones and the upwelling flux of the artificial sea-mount according to the first embodiment.

FIG. 3 shows the result of simulation of upwelling flux when the number of cones was limited to 3 to 5 to decrease the number of block bodies of the artificial sea-mount, and the vertex interval L between adjacent cones was changed. According to this simulation, if the vertex interval L is smaller than 0.75r or larger than 2r, the upwelling flux is smaller than the lower threshold (=0.625). On the other hand, when L=0.75 to 2r, the upwelling flux is larger than the lower threshold (=0.625). Especially, the upwelling flux is maximum when L=1.25r.

Figure 4:
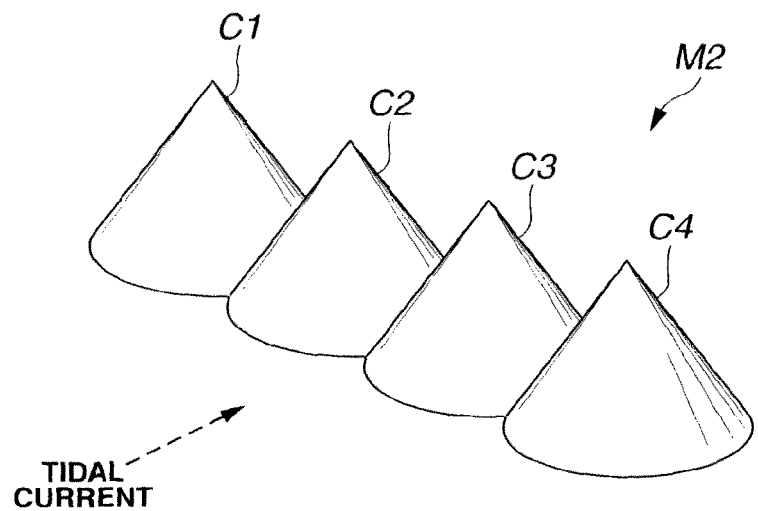
FIG. 4 is a perspective view of an artificial sea-mount according to a modification of the first embodiment.

In the first embodiment, three cones are arrayed linearly while partially overlapping. As is apparent from the simulation results in FIGS. 2 and 3, upwelling flux more than the lower threshold can be obtained using three or more cones. Hence, as shown in FIG. 4, an artificial sea-mount M2 may be formed by linearly arraying four cones C1 to C4. Five or six or more cones may be arrayed linearly, although not illustrated. In any case, the vertex interval L is preferably set within the range of 0.75r to 2r.

Second Embodiment

Figure 5A:
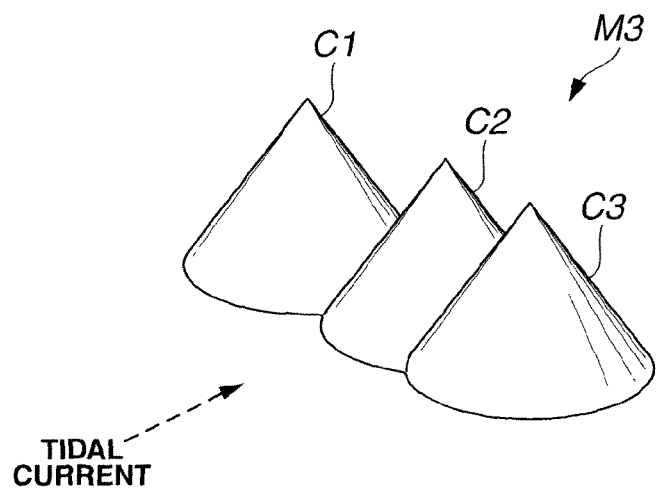
FIGS. 5A and 5B are perspective and front views of an artificial sea-mount according to the second embodiment of the present invention.
Figure 5B:
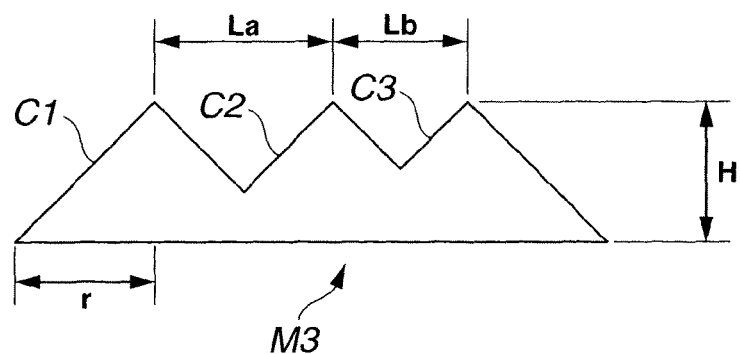

An artificial sea-mount M3 according to the second embodiment will be described next with reference to FIGS. 5A to 6. The fundamental arrangement is the same as in the first embodiment. In the second embodiment, a vertex interval La between, out of cones C1, C2, and C3 of the artificial sea-mount M3, the cones C1 and C2 and a vertex interval Lb between the cones C2 and C3 are different. Note that a height H and bottom radius r of each of the cones C1, C2, and C3 are the same as in the first embodiment. The vertex intervals La and Lb fall within the range of 0.75r to 2r, as in the first embodiment.

Figure 6:
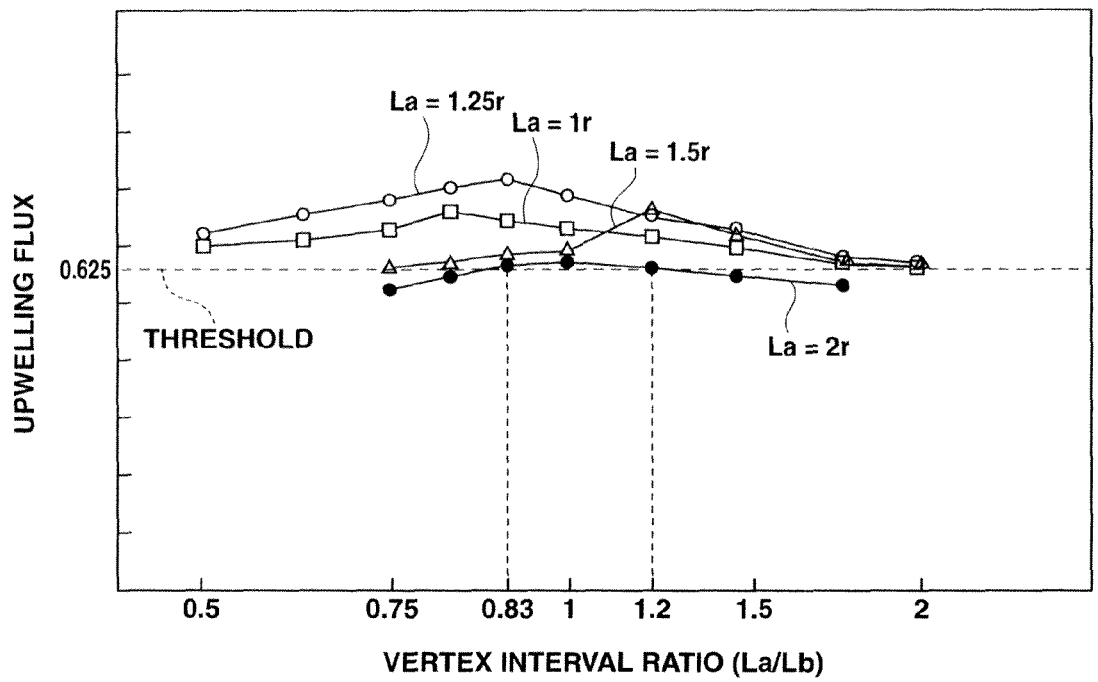
FIG. 6 is a graph showing the relationship between the vertex interval and the upwelling flux of the artificial sea-mount according to the second embodiment.

FIG. 6 shows the result of simulation of upwelling flux obtained by changing a ratio La/Lb of the vertex intervals La and Lb within the range of 0.5 to 2. When La/Lb=1, the vertex intervals La and Lb are equal so that the intervals between the vertices are uniform. According to this simulation, when La/Lb changes, upwelling flux slightly degrades or improves as compared to the artificial sea-mount M1 (first embodiment) in which the vertex intervals L are equal, but never falls below the threshold. Hence, when the vertex intervals La and Lb are unequal, the current riding across the artificial sea-mount M3 becomes more complex, and internal waves change due to its influence. The upwelling flux also changes, and may exceed the upwelling flux of the artificial sea-mount M1 (first embodiment). Especially when La/Lb=1.2 or La/Lb≈0.83, and for example, one of La and Lb is 1.25r, and the other is 1.5r, the upwelling flux is maximum, as is apparent from FIG. 6.

According to the artificial sea-mount M3 of the second embodiment, the gaps formed between the three cones never have a bilaterally symmetrical inverted triangular shape, unlike the first embodiment, because of the different vertex intervals between two adjacent cones. It was found that the gap shape which is different from that of the artificial sea-mount M1 of the first embodiment changes the vertical mixing effect, and an effect larger than in the artificial sea-mount M1 is sometimes obtained.

Third Embodiment

Figure 7A:
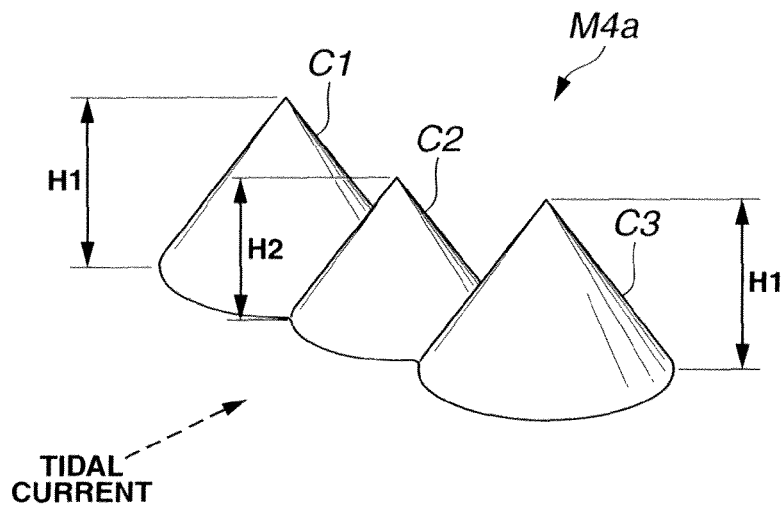
FIGS. 7A and 7B are perspective views of artificial sea-mounts according to modifications of the third embodiment of the present invention.
Figure 7B:
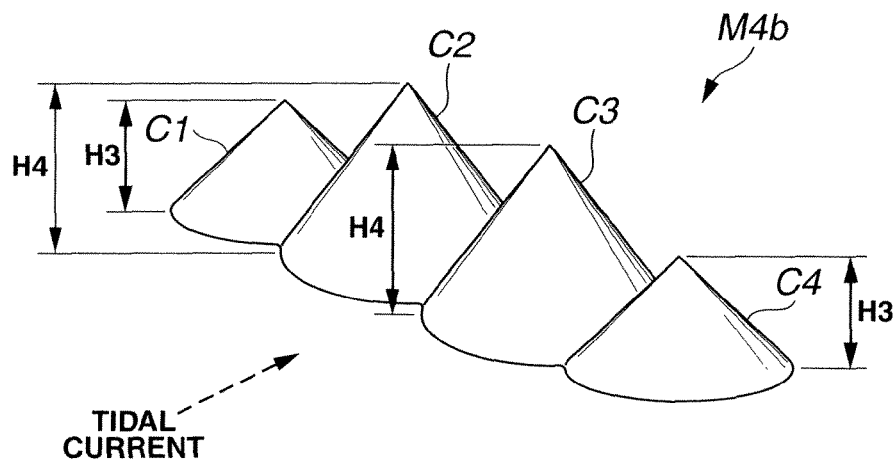

In the first and second embodiments, the plurality of cones that form an artificial sea-mount have the same vertex height H and the same bottom radius r. In the third embodiment, the plurality of cones may have different vertex heights. In FIG. 7A, an artificial sea-mount M4a of the third embodiment is formed by arraying three cones C1, C2, and C3. A vertex height H1 of the two cones C1 and C3 at the two ends is higher than a vertex height H2 of one cone C2 at the center. In FIG. 7B, an artificial sea-mount M4b of the third embodiment is formed by arraying four cones C1, C2, C3, and C4. A vertex height H3 of the two cones C1 and C4 at the two ends is lower than a vertex height H4 of the two cones C2 and C3 at the center. Note that since the cones have the same bottom radius r, the slant inclination of the conic surface changes between the cones with different vertex heights.

As a modification of the first embodiment, the plurality of cones may have different bottom radii r. When this is applied to the artificial sea-mount M1 shown in FIG. 1A, a bottom radius ra of, out of the three cones C1, C2, and C3, the two cones C1 and C3 at the two ends is set to be larger than a bottom radius rb of one cone C2 at the center, although not illustrated. Note that when adjacent cones have different bottom radii, the average radius ra of the different bottom radii of the adjacent cones is used. Letting r1 and r2 be the radii of two cones adjacent to each other, the average radius ra=(r1+r2)/2. In this case, a vertex interval L preferably ranges from 0.75ra to 2ra.

Such cones for which some or all of the vertex interval L, vertex height H, and bottom radius r are different can be constructed by performing control in consideration of the difference in the shape of block bodies to be dropped from the sea level depending on the material type, the number of block bodies, the size and positioning angle of the workboat in dropping, the dropping position, the release timing of a block body section restricted by wires or the like, loose restraint of a plurality of block bodies using biodegradable ropes or the like, and the tidal current velocity and direction, wind direction and velocity, and waves at the time of dropping.

Groups of a plurality of block bodies (to be referred to as block body groups hereinafter) are loaded in a plurality of stages on the workboat, and the block body groups of upper stage and those of lower stage are dropped with a time lag. This makes it possible to prevent conventionally unavoidable collision between the block body groups and the workboat main body. This allows to decrease the number of times of workboat navigation for dropping and improve the effect of reducing $CO_2$ emission upon navigation and the economic effect.

Fourth Embodiment

Figure 8:
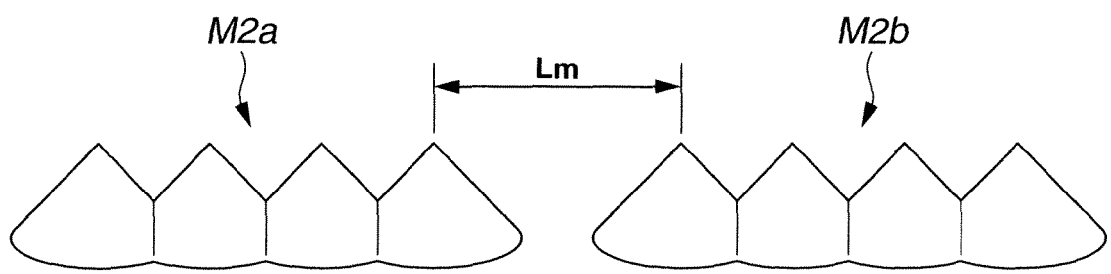
FIG. 8 is a front view of an artificial sea-mount according to the fourth embodiment of the present invention.

The fourth embodiment will be described next with reference to FIG. 8. In the fourth embodiment, a mountain group is formed by linearly arranging two or more artificial sea-mounts according to the first to third embodiments. In FIG. 8, an artificial sea-mount M2a (first cone array) and an artificial sea-mount M2b (second cone array), each of which has the same shape as that of the artificial sea-mount M2 formed from the four cones C1 to C4 shown in FIG. 4A, are linearly arrayed to form one mountain group. In the artificial sea-mounts M2a and M2b, a vertex interval L of the cones is set to 0.75r to 2r.

Figure 9:
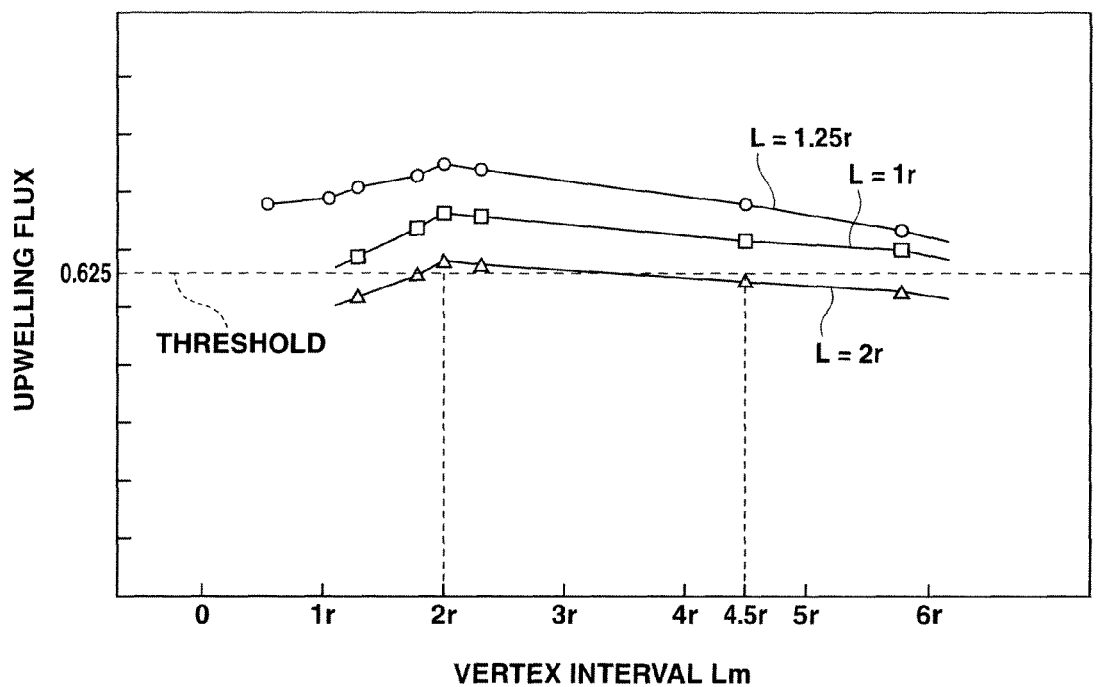
FIG. 9 is a graph showing the relationship between the distance between adjacent artificial sea-mounts and the upwelling flux according to the fourth embodiment.

FIG. 9 shows the relationship between upwelling flux and a vertex interval Lm (to be referred to as an adjacent mountain vertex interval Lm hereinafter) between the cones adjacently arranged at end portions of the two linearly arranged artificial sea-mounts M2a and M2b. FIG. 9 shows three cases wherein the vertex intervals are 1r, 1.25r, and 2r. As is apparent from this simulation, when the vertex interval between the cones of the artificial sea-mounts M2a and M2b is 2r, and the adjacent mountain vertex interval Lm between the artificial sea-mounts M2a and M2b is larger than 4.5r, the upwelling flux falls below the threshold. Otherwise, the upwelling flux is larger than the threshold. Hence, the adjacent mountain vertex interval Lm is preferably smaller than 4.5r. That is, if the adjacent mountain vertex interval Lm exceeds 4.5r, forming the mountain group is less significant. In addition, if the adjacent mountain vertex interval Lm is smaller than 2r, the mountain group is equivalent to the artificial sea-mounts according to the first to third embodiments which are formed by continuously arraying a plurality of cones, and therefore becomes less significant.

In the fourth embodiment, each of the artificial sea-mounts M2a and M2b induces effective vertical mixing, as in the first embodiment. Additionally, an inverted triangle-shaped gap is formed between the two artificial sea-mounts M2a and M2b as well, and many slanting surfaces of cones are formed. For this reason, changes in the current or vortices caused by the artificial sea-mounts M2a and M2b effectively act in the area where the artificial sea-mount group is constructed. It was found that vertical mixing occurs in a wide area along the array direction of the artificial sea-mounts included in the artificial sea-mount group, and this produces a more excellent synergistic effect than that of the single artificial sea-mounts M2a and M2b.

In the fourth embodiment as well, an artificial sea-mount group can be constructed by linearly arranging a plurality of artificial sea-mounts each formed from cones with different vertex intervals L or vertex heights H, as in the third embodiment.

In the first to fourth embodiments, when constructing an artificial sea-mount that maximizes upwelling flux, for example, the depth, current state, density distribution, nutrient salts concentration distribution, and the like in the target sea area are used as input data. In addition, the number of cones, vertex interval, vertex height of cones, bottom radius, slant inclination, number of sea-mounts included in an artificial sea-mount group, interval between the sea-mounts, and the like are used as parameters. An artificial sea-mount which exhibits the maximum effect can be obtained by performing analytical operations such that the vertical mixing amount per unit volume of the artificial sea-mount on a horizontal cross section near the compensation depth is maximized, and the total vertical mixing amount near the compensation depth is maximized. In this case, the total vertical mixing amount may be obtained by integrating vertical mixing amounts in water depth zones on both sides of the compensation depth. In addition, an optimum shape and scale of the artificial sea-mount may be calculated in consideration of the reciprocal currents of tidal ebb and flow.

In the above-described simulation, upwelling flux is defined as the amount of nutrient salts vertically passing through a horizontal cross section at each depth in the whole flow calculation area. Otherwise, the upwelling flux can be obtained by averaging, for a long time, the amounts of nutrient salts vertically moving through the compensation depth in all vertical cross sections downstream the artificial sea-mount.

In the first to fourth embodiments, the artificial sea-mount is constructed by piling up block bodies directly on the seabed. However, if the seabed is soft, it may be difficult to construct an artificial sea-mount as expected because the piled block bodies are buried. In this case, preferably, members such as block bodies are uniformly laid on the seabed to form a foundation in advance by preliminary works for artificial sea-mount construction, and the artificial sea-mount is constructed on the foundation.

The present invention is applicable to an artificial sea-mount constructed on the seabed, and especially employable independently of the construction method.

As described above, according to the present invention, it is possible to provide an artificial sea-mount which induces effective vertical mixing near the compensation depth even in the deep sea area with strong density stratification.

What is claimed is:

1. An artificial sea-mount constructed by piling up a plurality of block bodies, sunk in sea from the surface thereof, on the seabed to vertically mix seawater in a peripheral sea area using a tidal current, ocean current, and internal wave in the sea area where the plurality of block bodies are piled up, comprising:
   a first cone array formed from the plurality of block bodies and including at least three conical structures, each conical structure partially overlapping an adjacent conical structure and are linearly arrayed on the seabed in the continental shelf area,
   wherein a vertex interval between the conical structures adjacent to each other in said first cone array is set to 0.75 times to 2 times an average value of the bottom radii of the adjacent conical structures, so as to thereby induce, in the continental shelf area, vertical mixing of the seawater below a compensation depth containing nutrient salts with the seawater above the compensation depth where phytoplankton grows under sunlight.

2. An artificial sea-mount according to claim 1, wherein the at least three conical structures in the first cone array have different vertex intervals therebetween.

3. An artificial sea-mount according to claim 1, further comprising a second cone array formed from the plurality of block bodies and including at least three conical structures that partially overlap an adjacent conical structure used to form the second cone array and are linearly arrayed on the seabed in the continental shelf area,
   wherein the first and second cone arrays are linearly arranged with an inverted triangle-shaped gap therebetween.

4. An artificial sea-mount according to claim 3, wherein a vertex interval between the conical structures arranged at adjacent ends of said first and second cone arrays is set to 2 times to 4.5 times the bottom radius of the conical structures.

5. An artificial sea-mount according to claim 1, wherein said first cone array is arrayed in a direction perpendicular to at least one of the tidal current, ocean current, and internal wave.

6. An artificial sea-mount according to claim 1, wherein said first cone array has sides surfaces formed each as a conical surface.

7. An artificial sea-mount provided with conical structures constructed, on the seabed, of a plurality of block bodies that are sunk in sea from the surface thereof, comprising:
   a cone array formed from the plurality of block bodies and including at least three conical structures, each conical structure partially overlapping an adjacent conical structure and are linearly arrayed on the seabed in the continental shelf area, in a direction perpendicular to at least one of the tidal current, ocean current, and internal wave, wherein said cone array has side surfaces formed each as a conical surface, and wherein a vertex interval between the conical structures adjacent to each other in said cone array is set to 0.75 times to 2 times an average value of the bottom radii of the adjacent conical structures, so as to thereby cause, in the continental shelf area, seawater below a compensation depth containing nutrient salts upwelling to a sea zone above the compensation depth where phytoplankton grows under sunlight.

* * * * *